United States Patent
Abotabl et al.

(10) Patent No.: US 11,463,966 B2
(45) Date of Patent: Oct. 4, 2022

(54) CLUTTER REFLECTION MITIGATION IN FULL-DUPLEX COMMUNICATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/153,680

(22) Filed: Jan. 20, 2021

(65) Prior Publication Data

US 2021/0352594 A1  Nov. 11, 2021

Related U.S. Application Data

(60) Provisional application No. 63/021,946, filed on May 8, 2020.

(51) Int. Cl.
*H04B 7/0413* (2017.01)
*H04W 52/24* (2009.01)
*H04W 76/27* (2018.01)
*H04W 74/08* (2009.01)
*H04W 52/14* (2009.01)

(52) U.S. Cl.
CPC ....... *H04W 52/243* (2013.01); *H04W 52/143* (2013.01); *H04W 74/0833* (2013.01); *H04W 76/27* (2018.02)

(58) Field of Classification Search
CPC ..... H04B 7/0413; H04W 52/24; H04W 76/27
See application file for complete search history.

(56) References Cited

U.S. PATENT DOCUMENTS

2018/0123710 A1* 5/2018 Kim ................... H04B 17/345

* cited by examiner

*Primary Examiner* — Tu X Nguyen
(74) *Attorney, Agent, or Firm* — Haynes and Boone, LLP

(57) ABSTRACT

A clutter-induced interference at a base station is mitigated through a command from the base station to a user equipment that commands the user equipment to transmit using an increased transmit power. During acquisition, the command may comprise a SIB. During a connected mode of operation, the command may comprise a TPC message, assistance information, an RRC message, or a DCI message.

16 Claims, 8 Drawing Sheets

CLUTTER REFLECTION MITIGATION IN FULL-DUPLEX COMMUNICATION

CROSS-REFERENCE TO RELATED APPLICATIONS

The present application claims the benefit of U.S. Provisional Patent Application No. 63/021,946, filed May 8, 2020, which is hereby incorporated by reference in its entirety.

TECHNICAL FIELD

The technology discussed below relates generally to wireless communication systems, and more particularly, to clutter reflection mitigation for wireless communication.

BACKGROUND

To meet the growing demands for expanded mobile broadband connectivity, wireless communication technologies are advancing from the long term evolution (LTE) technology to a next generation new radio (NR) technology, which may also be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. Despite this wide array of spectrum bands, the available bandwidth to any given user may not be sufficient for high-data-rate communication.

To increase bandwidth efficiency, NR allows the use of in-band full duplex (IBFD) in which the uplink and downlink use the same frequency band simultaneously. Although IBFD is advantageously bandwidth efficient, the simultaneous operation of both uplink and downlink inevitably causes some degree of self-interference such as from reflections from clutter. This self-interference is also present in sub-band frequency duplex operation in which a guard band separating the transmitting and receiving bands is relatively small.

SUMMARY

In accordance with a first aspect of the disclosure, a method of wireless communication for a user equipment (UE is provided that includes: receiving a clutter-based power command at the UE, the clutter-based power command indicating a presence of a clutter-induced interference at a base station; increasing a transmit power from an initial transmit power level to an increased power level responsive to the clutter-based power command; and transmitting a message from the UE to the base station using the increased transmit power.

In accordance with a second aspect of the disclosure, a method of clutter mitigation for a base station is provided that includes: scanning through a plurality of antenna beams for the base station to identify an affected antenna beam that is subjected to a clutter-induced interference; transmitting a clutter-based power command from the base station using the affected antenna beam; and receiving at the base station a message from a user equipment having a transmit power that is increased from an initial transmit level responsive to the clutter-based power command.

In accordance with a third aspect of the disclosure, a user equipment is provided that includes: a processor configured to configured to issue a command for a transmit power increase responsive to a clutter-based power command from a base station indicating a presence of a clutter-induced interference at the base station; and a transceiver configured to transmit a message to the base station using an increased transmit power relative to an initial transmit power responsive to the command from the processor.

In accordance with a fourth aspect of the disclosure, a base station is provided that includes: a processor configured to scan through a plurality of antenna beams to identify an affected antenna beam that is subjected to a clutter-induced interference; and a transceiver configured to transmit a clutter-based power command using the affected antenna beam, wherein the clutter-based power command is a command to a user equipment to increase its transmit power to mitigate the clutter-induced interference.

These and other aspects of the disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

A variety of clutter mitigation systems and methods are disclosed herein. In particular, a novel clutter-based power command such as a System Information Block (SIB) is introduced that identifies the presence of clutter. A user equipment (UE) may then respond with an increased transmit power during the initial access procedure. The likelihood of a successful initial access procedure is thus increased so that the UE may proceed to a connected mode of operation. The clutter mitigation techniques and methods disclosed herein are not limited to the initial access procedure but also extend to the connected mode of operation. A variety of clutter-based power commands are disclosed herein that may inform the UE of the presence of clutter during the connected mode of operation so that the UE may transmit its downlink (DL) messages with increased transmit power. Clutter-induced interference is thus mitigated during both the initial access procedure and the connected mode of operation by the clutter mitigation techniques and systems disclosed herein. Some preliminary considerations will now be discussed followed by a discussion of some exemplary implementations.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Refers to 5G technologies and the new radio access technology undergoing definition and standardization by 3GPP in Release 15.

Beamforming: directional signal transmission or reception. For a beamformed transmission, the amplitude and phase of each antenna in an array of antennas may be precoded, or controlled to create a desired (e.g., directional) pattern of constructive and destructive interference in the wave front.

DCI: downlink control information. A set of information transmitted at the L1 Layer that, among other things, schedules the downlink data channel (e.g., PDSCH) or the uplink data channel (e.g., PUSCH).

MAC-CE: media access control—control element. A MAC structure used for carrying MAC layer control information between a gNB and a UE. The structure may be implemented as a special bit string in a logical channel ID (LCID) field of a MAC Header.

Figure 1:
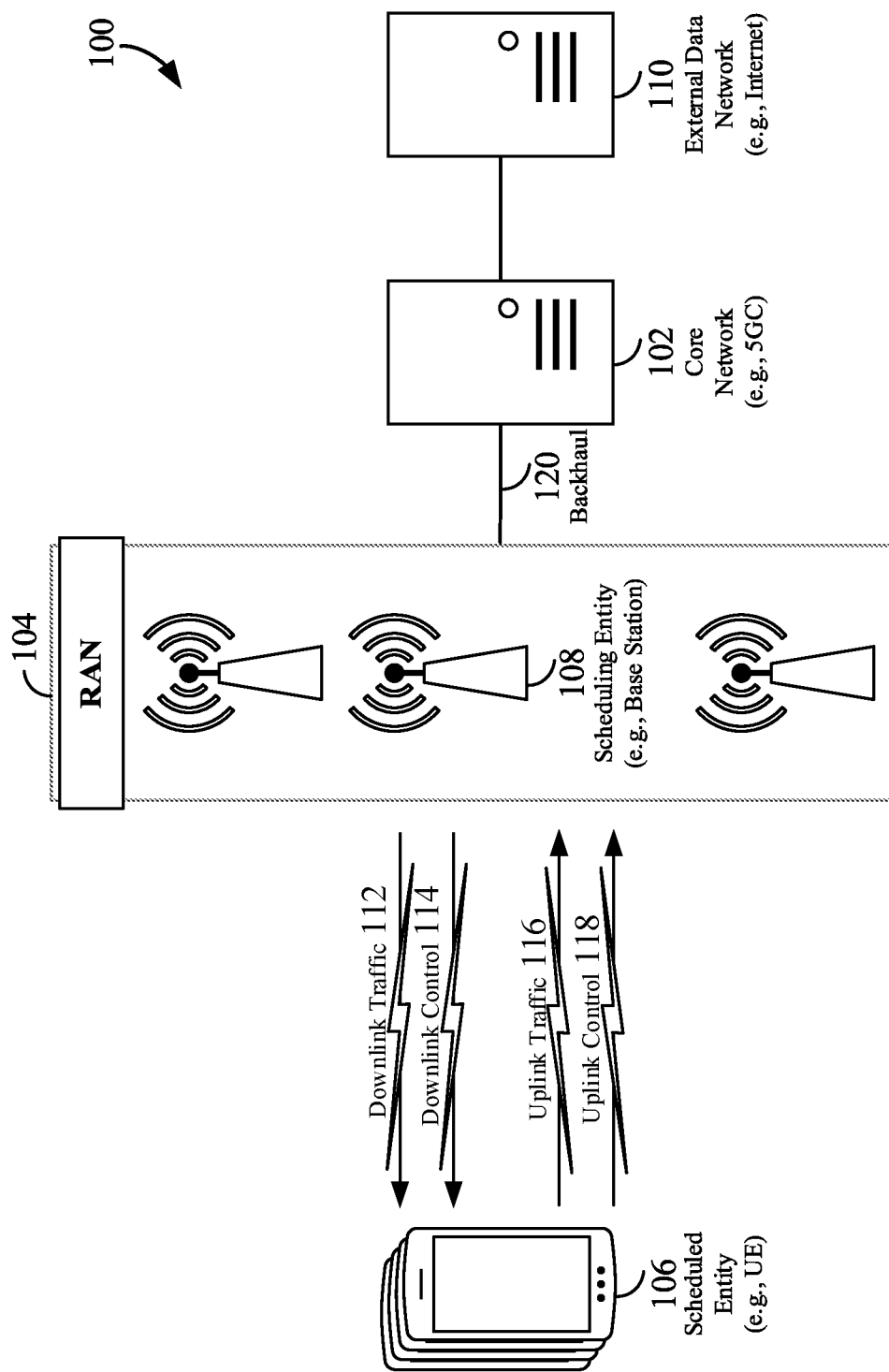
FIG. 1 is a schematic illustration of a wireless communication system with clutter-induced interference mitigation in accordance with an aspect of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a plurality of user equipment (UE) 106. By virtue of the wireless communication system 100, each UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Each base station 108 is responsible for radio transmission and reception in one or more cells. In different technologies, standards, or contexts, a base station 108 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Each UE 106 may be an apparatus that provides a user with access to network services.

Transmissions over the air interface from a base station 108 to one or more UEs 106 may be referred to as downlink (DL) transmissions. Transmissions from a UE 106 to a base station 108 may be referred to as uplink (UL) transmissions. As illustrated in FIG. 1, a base station 108 may broadcast downlink traffic 112 to one or more UEs 106. Each base station 108 is a node or device responsible for scheduling the downlink traffic 112 and, in some examples, uplink traffic 116 from the one or more UEs 106. On the other hand, each UE 106 is a node or device that receives downlink control information 114, including but not limited to scheduling information, synchronization or timing information, or other control information from a base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In a network configured for UL-based mobility, UL reference signals from each UE 106 may be utilized by the network 104 to select a serving cell for each UE 106. In some examples, the base stations 108 may broadcast unified synchronization signals (e.g., unified Primary Synchronization Signals (PSSs), unified Secondary Synchronization Signals (SSSs) and unified Physical Broadcast Channels (PBCH)). The UEs 106 may receive the unified synchronization signals, derive the carrier frequency and slot timing from the synchronization signals, and in response to deriving timing, transmit an uplink pilot or reference signal. The uplink pilot signal transmitted by a UE 106 may be concurrently received by two or more cells each having its own base station 108 within the radio access network 104. Each cell may measure a strength of the pilot signal, and the radio access network 104 may then determine a serving cell for the UE 106. As each UE 106 travels through a cell, the network 104 may continue to monitor the uplink pilot signal transmitted by the UE 106. When the signal strength or quality of the pilot signal measured by a neighboring cell exceeds that of the signal strength or quality measured by the serving cell, the network 104 may handover the UE 106 from the serving cell to a neighboring cell, with or without informing the UE 106.

Figure 2:
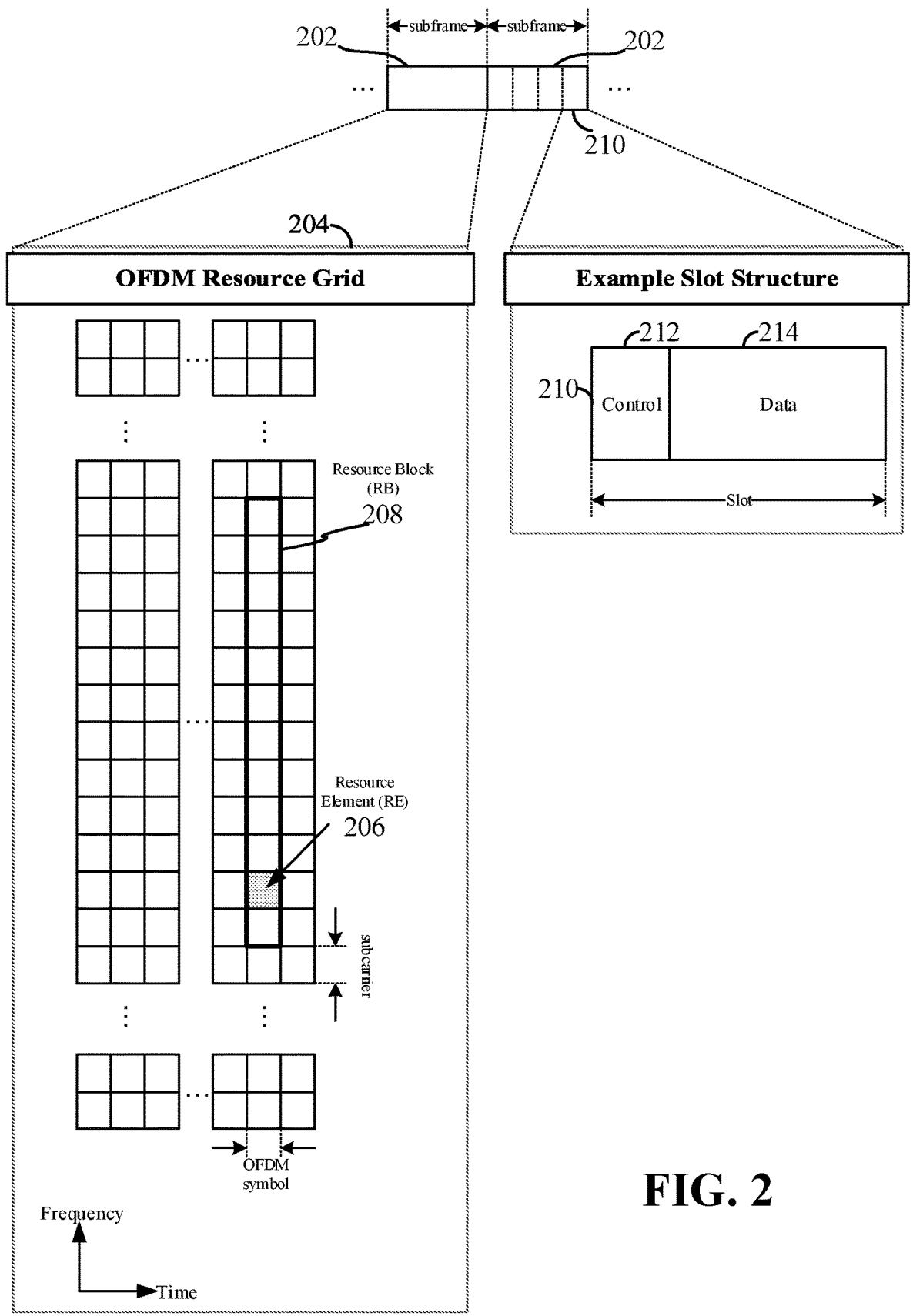
FIG. 2 is a schematic illustration of an organization of wireless resources utilizing orthogonal frequency divisional multiplexing (OFDM) for the wireless communication system of FIG. 1.

Various aspects of the present disclosure will be described with reference to an OFDM waveform, schematically illustrated in FIG. 2. Within the present disclosure, a frame refers to a duration of 10 ms for wireless transmissions, with each frame consisting of 10 subframes of 1 ms each. On a given carrier, there may be one set of frames in the UL, and another set of frames in the DL. An expanded view of an exemplary DL subframe 202 is also illustrated in FIG. 2, showing an OFDM resource grid 204. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 204 may be used to schematically represent time-frequency resources for a given antenna port. That is, in a MIMO implementation with multiple antenna ports available, a corresponding multiple number of resource grids 204 may be available for communication. The resource grid 204 is divided into multiple resource elements (REs) 206. An RE 206, which is 1 subcarrier×1 symbol, is the smallest discrete part of the time-frequency grid, and contains a single complex value representing data from a physical channel or signal. A block of twelve consecutive subcarriers defined a resource block (RB) 208, which has an undefined time duration in the NR standard. In FIG. 2, resource block 208 extends over a symbol duration. Within the present disclosure, it is assumed that a single RB such as the RB 208 entirely corresponds to a single direction of communication (either transmission or reception for a given device). A set of contiguous RBs 208 such as shown for resource grid 404 form a bandwidth part (BWP).

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of a slot 210 illustrates a control region 212 and a data region 214. In general, the control region 212 may carry control channels (e.g., PDCCH), and the data region 214 may carry data channels (e.g., PDCCH or PUSCH). A slot 210 may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 208.

Given this preliminary discussion, some exemplary implementations for addressing clutter interference will now be discussed in more detail.

Exemplary Implementations for Clutter Interference Mitigation

Figure 3A:
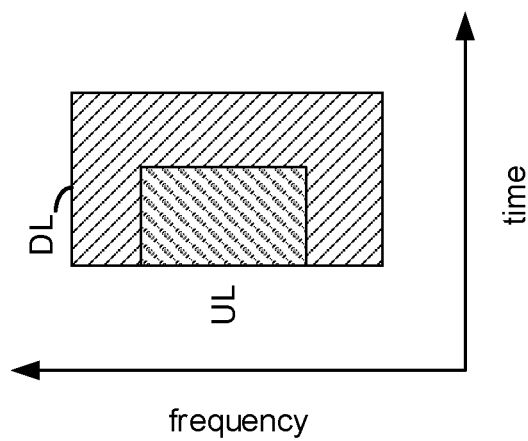
FIG. 3A illustrates a first set of time and frequency resources for an uplink transmission included within a second set of time and frequency resources for a downlink transmission.
Figure 3B:
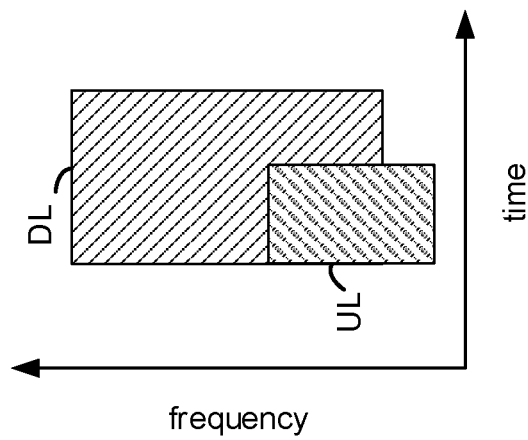
FIG. 3B illustrates a first set of time and frequency resources for an uplink transmission that partially overlap with a second set of time and frequency resources for a downlink transmission.
Figure 3C:
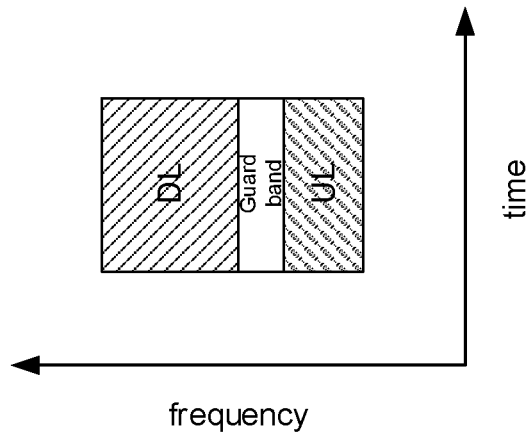
FIG. 3C illustrates a first set of time and frequency resources for an uplink transmission that are separated by a guard band from a second set of time and frequency resource for a downlink transmission.

The following discussion will focus on clutter reflections of the downlink transmissions from each base station 108 since the multiple beams from the base station increase the likelihood of clutter reflections. These clutter reflections are present in several types of full duplex operation. For example, clutter reflections may cause interference for an in-band full-duplex (IBFD) operation in which the time and frequency resources for the uplink (UP) may be completely shared with the downlink (DL) as shown in FIG. 3A. Alternatively, clutter reflections may cause interference for an IBFD operation in which the DL and UL partially share their time and frequency resources as shown in FIG. 3B. In addition, clutter reflections may also disturb a sub-band frequency division duplex (FDD) operation in which the DL and UL frequency bands are separated by a relatively-narrow guard band as shown in FIG. 3C.

Figure 4:
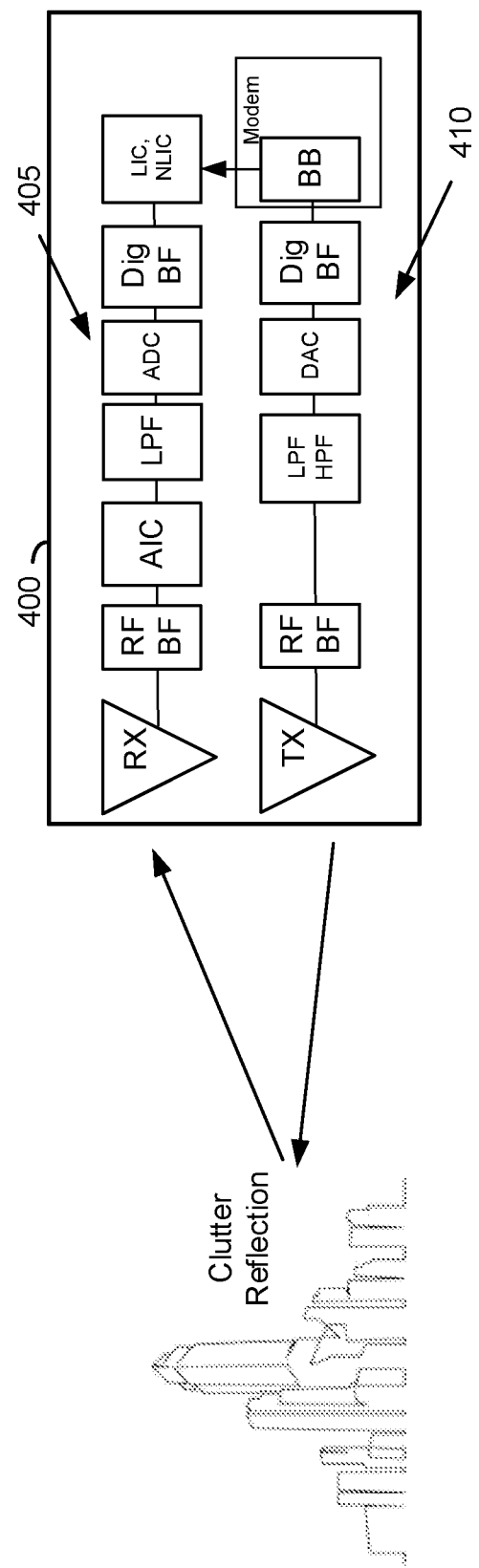
FIG. 4 illustrates a base station transceiver in the system of FIG. 1 experiencing a clutter-induced interference.

The interference caused by clutter reflections in either IBFD or sub-band FDD operation may be better appreciated with regard to an example base station transceiver 400 as shown in FIG. 4. Transceiver 400 include a transmit chain 410 that includes a modem in which a baseband (BB) section generates a digital baseband signal to be transmitted. Transceiver 400 may be included within a base station 108 of FIG. 1. A digital beam forming filter (Dig BF) filters the digital baseband signal before it is converted into an analog baseband signal by a digital-to-analog converter (DAC). The resulting analog baseband signal is upconverted into RF in a mixing stage (not illustrated) before being filtered in a low pass filter (LPF) or high-pass filter (HPF) to form a filtered RF signal. The filtered RF signal may then be beamformed in an analog RF beamforming stage (RF BF) before being transmitted by a transmit array of antennas (TX) to form a downlink (DL) transmission.

Depending upon the transmission direction, the DL transmission may be reflected by clutter to interfere with an UL reception by a receive chain 405 in transceiver 400 that includes a receive array of antenna (RX). A received RF signal is processed through an analog beamforming stage (RF BF) and then processed in an analog interference cancellation stage (AIC) before being low-pass filtered (LPF). The filtered RF signal is down converted to baseband in a mixing stage (not illustrated) before being converted into a digital received baseband signal in an analog-to-digital converter (ADC). After processing through a digital beamforming stage (Dig BF) the received baseband signal may be processed by a linear interference cancellation (LIC) state and/or by a non-linear interference cancellation (NLIC) stage responsive to the transmit baseband signal from the modem.

Although receive chain 405 may include both analog and digital interference cancellation, such interference cancellation can be overwhelmed by the clutter reflection. To further mitigate clutter interference, the UEs 106 disclosed herein are controlled to adapt their uplink transmit power. This transmit power adaptation occurs in both an initial access procedure and subsequent to acquisition during a connected mode of operation.

Figure 5:
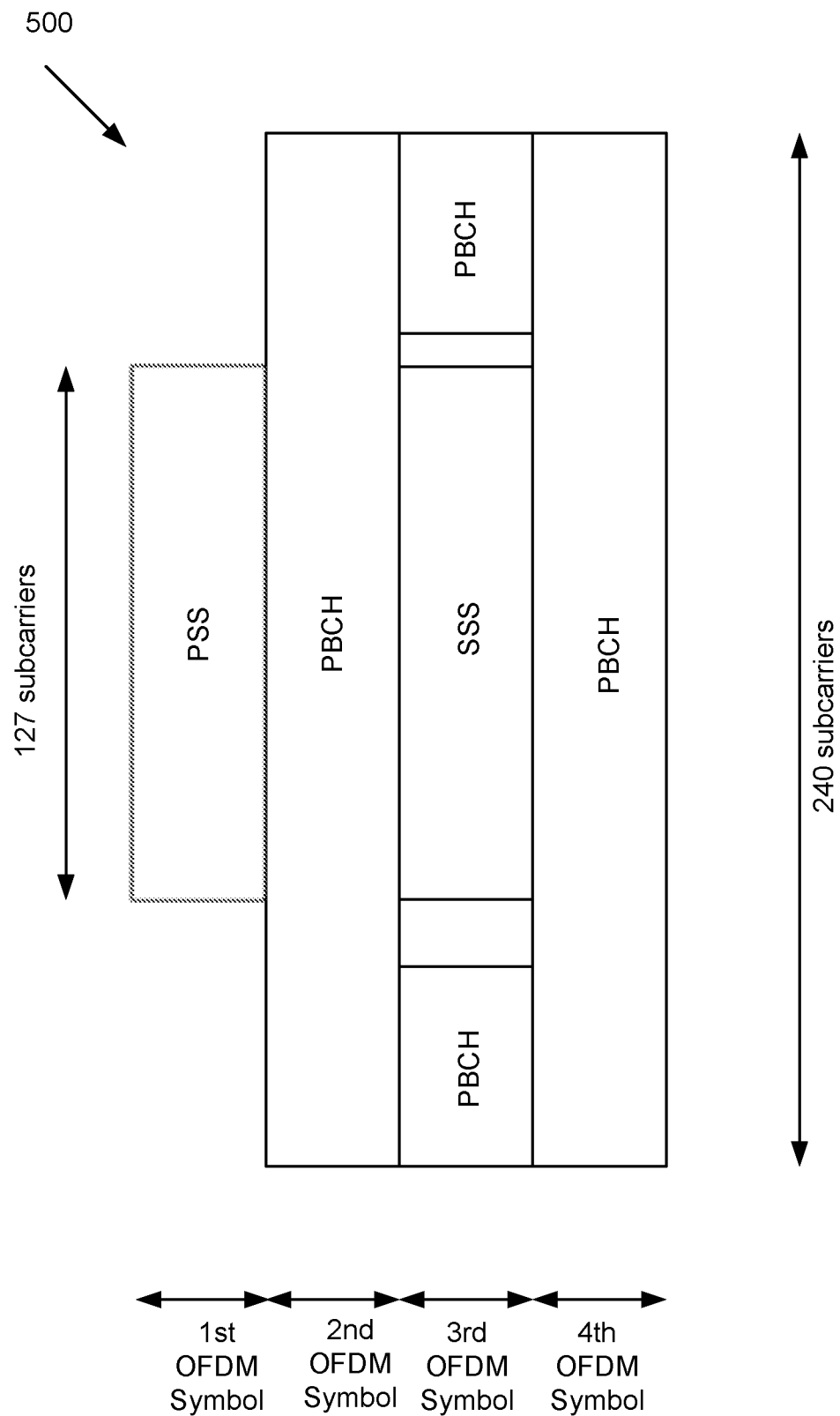
FIG. 5 illustrates a synchronization signal block (SSB) for a base station in the system of FIG. 1.

Referring again to FIG. 1, each UE 106 establishes a connection with an appropriate base station 108 through the initial access procedure. This initial access procedure involves cell search and selection, in which a UE 106 obtains system information associated with the network. In an NR network, each base station 108 sequentially transmits a synchronization signal block (SSB). An example SSB block 500 is shown in FIG. 5. SSB 500 extends over four OFDM symbols. The available bandwidth for SSB 500 is 240 subcarriers, which is 20 resource blocks. A first OFDM symbol may include a primary synchronization signal (PSS) that extends across 127 subcarriers within the center of the available bandwidth. A physical broadcast channel (PBCH) occupies all 240 subcarriers in a second OFDM symbol. A secondary synchronization signal (SSS) occupies the center 127 subcarriers within a third OFDM signal. If the 240-subcarrier bandwidth for SSB 500 is deemed to extend from a first resource block to a twentieth resource block, the PBCH occupies the first 4 resource blocks and the final four resource blocks in the third OFDM symbol. The PBCH also occupies all 240 subcarriers in a fourth OFDM symbol. The PBCH provides system information including a master information block (MIB). The MIB identifies parameters so that each corresponding UE 106 in a footprint (within the cell coverage) of a base station 108 may acquire a first SIB (SIB1). The SIB1 (not illustrated) contains information on the scheduling of other SIBs. In some implementations, a SIB such as SIB1 provides a transmit power adjustment command for a UE 106 to adjust the transmit power it uses to transmit its uplink messages.

Each base station 108 periodically transmits a burst of SSBs, each SSB being assigned to a specific antenna beam. For example, if a base station 108 has N antenna beams, there would be N different SSBs uniquely assigned to the N corresponding antenna beams. If the beams are deemed to be numbered from one to N, the corresponding SSBs may be numbered accordingly to range from an SSB1 to an SSBN. In such an implementation, the SSB burst would be the N SSBs. The maximum value for the integer N depends upon the frequency band. For example, below 3 GHz, there can be up to four antenna beams and corresponding SSBs. The integer N is increased for higher frequency bands such as up to 64 for the Frequency Range 2 (FR2) frequency band. In an SSB, the PBCH provides a block time index that identifies the relative location of the SSB within an SSB burst. From an SSB, a UE 106 receives the information necessary to acquire the corresponding SIB1 that in turn provides the UE 106 with the information necessary to carry out an initial random-access (the initial access procedure) to the corresponding base station 108. This information includes the identity of the corresponding RACH occasions for a given SSB. The RACH occasions are specific time and frequency resources in which a UE 106 transmits a RACH preamble to begin the random-access procedure. The RACH occasions may be unique to a specific SSB so that by receiving a RACH preamble in the corresponding RACH occasion, a base station 108 may identify which of its beams corresponds to the specific SSB/RACH occasion. The base station 108 may then respond to the RACH preamble with a random-access response (message 2). This random-access response may provide a timing correction based upon the timing of the received RACH preamble and includes a scheduling grant of time and frequency resources within which the UE 106 may then respond with a message 3 having a timing adjusted by the timing correction if necessary.

It is conventional during the initial access procedure for a UE 106 to increase the RACH preamble transmit power if an initial RACH preamble is not successfully acknowledged by the corresponding base station 108. For example, a UE 106 may estimate the received power of an SSB and, using an a priori estimate of the path loss, calculate a corresponding initial transmit power based upon the received SSB power and the estimated path loss. The UE 106 may then transmit an initial RACH preamble using the initial transmit power. If the initial RACH preamble is not successfully acknowledged, the UE 106 may then transmit a subsequent RACH preamble using an increased transmit power. But this ramping of the RACH preamble transmit power over successive RACH preamble transmissions increases latency, particularly if the base station antenna beam that the RACH preamble transmissions are responding to is subject to interference from clutter reflections as discussed with regard to FIG. 4.

Figure 6:
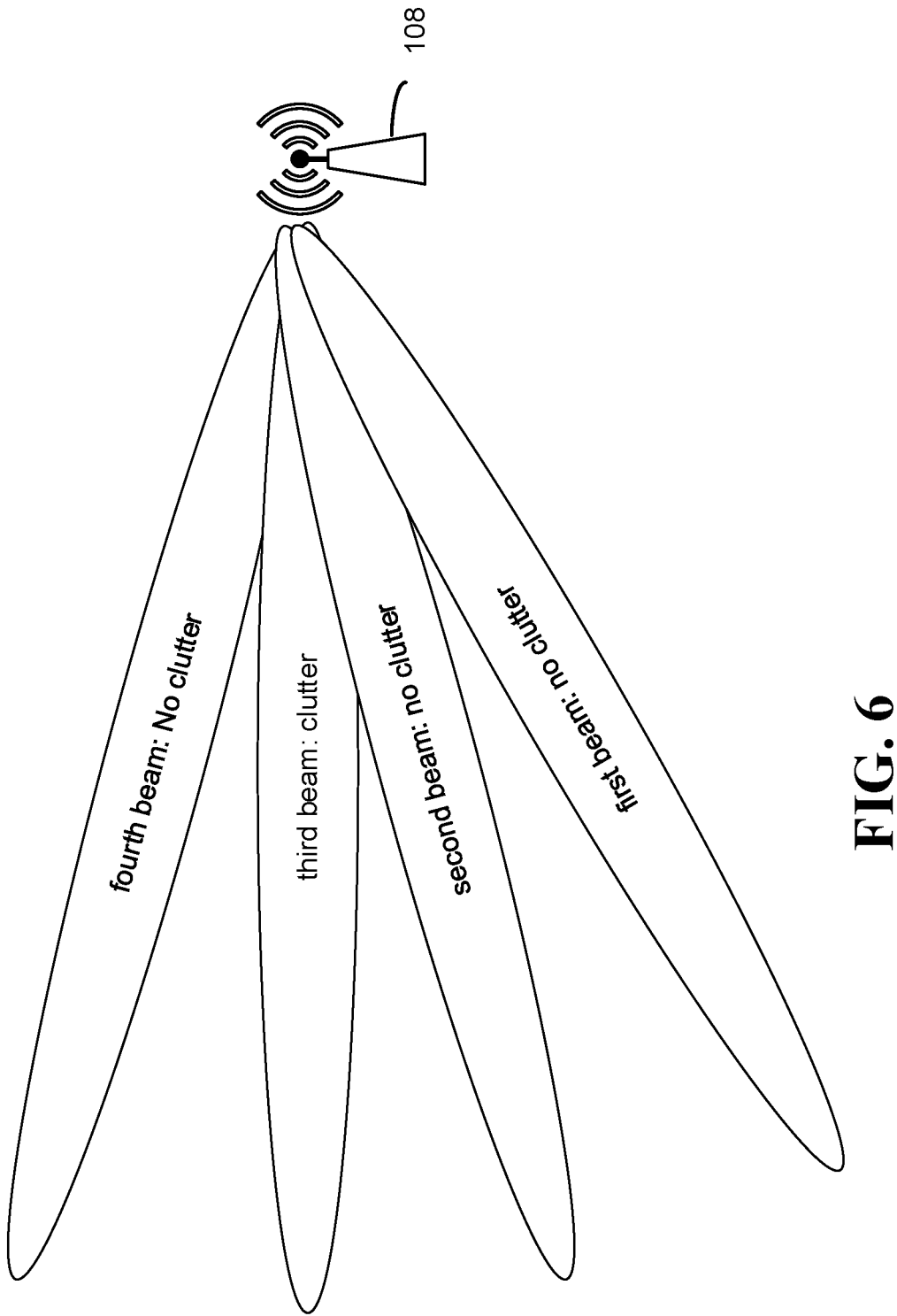
FIG. 6 illustrates a base station from the system of FIG. 1 sweeping through a plurality of antenna beams to determine whether any of the antenna beams are subjected to clutter-induced interference in accordance with an aspect of the disclosure.

To mitigate this clutter-reflection-induced interference and latency during the initial access procedure, each base station 108 may be configured to detect those antenna beams which are subjected to a relatively-high amount of clutter interference during uplink reception. For example, a base station 108 may periodically (or aperiodically) sweep through its various antenna beams to measure the clutter reflection power. An example sweep or scan by a base station 108 through a set of four antenna beams including a first beam, a second beam, a third beam, and a fourth beam is shown in FIG. 6. In such a sweep, the base station 108 would transmit a downlink signal on certain time and frequency resource in a given beam. The base station 108 may reserve these time and frequency resources to the clutter identification sweep so that there are no uplink transmissions in these reserved resources. In these same time and frequency resources as used for the downlink transmission, the base station 108 would measure the clutter reflection power in the uplink across its various antenna beams. Based upon these measurements, base station 108 has identified that receiving an uplink signal over the third antenna beam is subjected to clutter interference. As noted earlier, each antenna beam has its own SSB and corresponding SIBs such as SIB1. Such a pre-existing SIB or a newly-defined SIB disclosed herein is adapted to become a clutter-notifying SIB to notify a UE 106 that the corresponding SSB is associated with high amounts of clutter interference if the UE 106 were to respond to the SSB with a RACH preamble. Such a clutter-notifying SIB can be binary in that it either notifies of the presence of clutter interference or of the absence of clutter interference. For example, the clutter-notifying SIB could include a one-bit field that is either true or false to indicate the corresponding presence or absence of clutter. In response, a UE 106 may transmit a random-access message such a RACH preamble in the corresponding RACH occasion with an increased transmit power. Note how advantageous such a clutter notification is in that there is no time wasted with the UE 106 using an initial transmit power for its RACH preamble that will then not be successfully acknowledged by the base station 108 due to the presence of clutter interference. Latency is thus reduced and power conserved due to less power being expended on RACH preambles that will not be successfully acknowledged.

In an alternative implementation, the clutter-identifying SIB may include an estimate of the clutter interference power. For example, the clutter-identifying SIB may include a multi-bit field that classifies the clutter power. In one implementation, the multi-bit clutter power field is a two-bit clutter power field that would identify four levels of clutter interference: no clutter, a first level of clutter interference, a second level of clutter interference, and a maximum level of clutter interference. The maximum level of clutter interference is greater than the second level of clutter interference. Similarly, the second level of clutter interference is greater than the first level of clutter interference. It will be appreciated that the clutter power field may be greater than two-bits in alternative implementations so that even more levels of clutter interference may be differentiated or classified. In response to the multi-bit clutter power field, a UE 106 adjusts or increments its transmit power accordingly. For example, a UE 106 may have four different transmit powers that may be used in response to the two-bit clutter power field example discussed above. Should the clutter power field indicate the lack of clutter interference, the UE 106 may then use an initial or default transmit power. If, however, the clutter power field indicates that there is a maximum level of clutter interference, the UE 106 may then use a maximum transmit power. The first and second levels of clutter discussed above would similarly be responded to by the UE 106 with the use of a first mid-level transmit power or a second mid-level transmit power, respectively, where the first mid-level transmit power is greater than the initial transmit power but less than the second mid-level transmit power, and where the second mid-level transmit power is greater than the first mid-level transmit power but less that the maximum transmit power. These various transmit powers are used by the UE 106 to transmit a RACH preamble in the corresponding RACH occasion.

The clutter mitigation during the connected mode of operation following the initial access period is analogous. But note that during the connected mode of operation, a base station 108 will know when a UE 106 will be transmitting an uplink message that will be in an IBFD relationship with a downlink message from the base station 108 since the base station 108 has scheduled the uplink message from the UE 106. This IBFD relationship may be a total overlap of the time/frequency resources as discussed with regard to FIG. 3A or may be a partial overlap as discussed with regard to FIG. 3B. Alternatively, the UE 106 may be transmitting an uplink message that is in a sub-band FDD relationship with a downlink message from the base station 108 as discussed with regard to FIG. 3C. In all these full duplex situations, the base station 108 may thus anticipate that the uplink message will be affected by a clutter reflection if the uplink message is being received on an antenna beam that has been identified through its periodic or aperiodic sweep to be subjected to clutter-induced interference. To mitigate this clutter interference, the base station 108 may use control messages to notify the UE 106 to use an increased transmit power.

Figure 7:
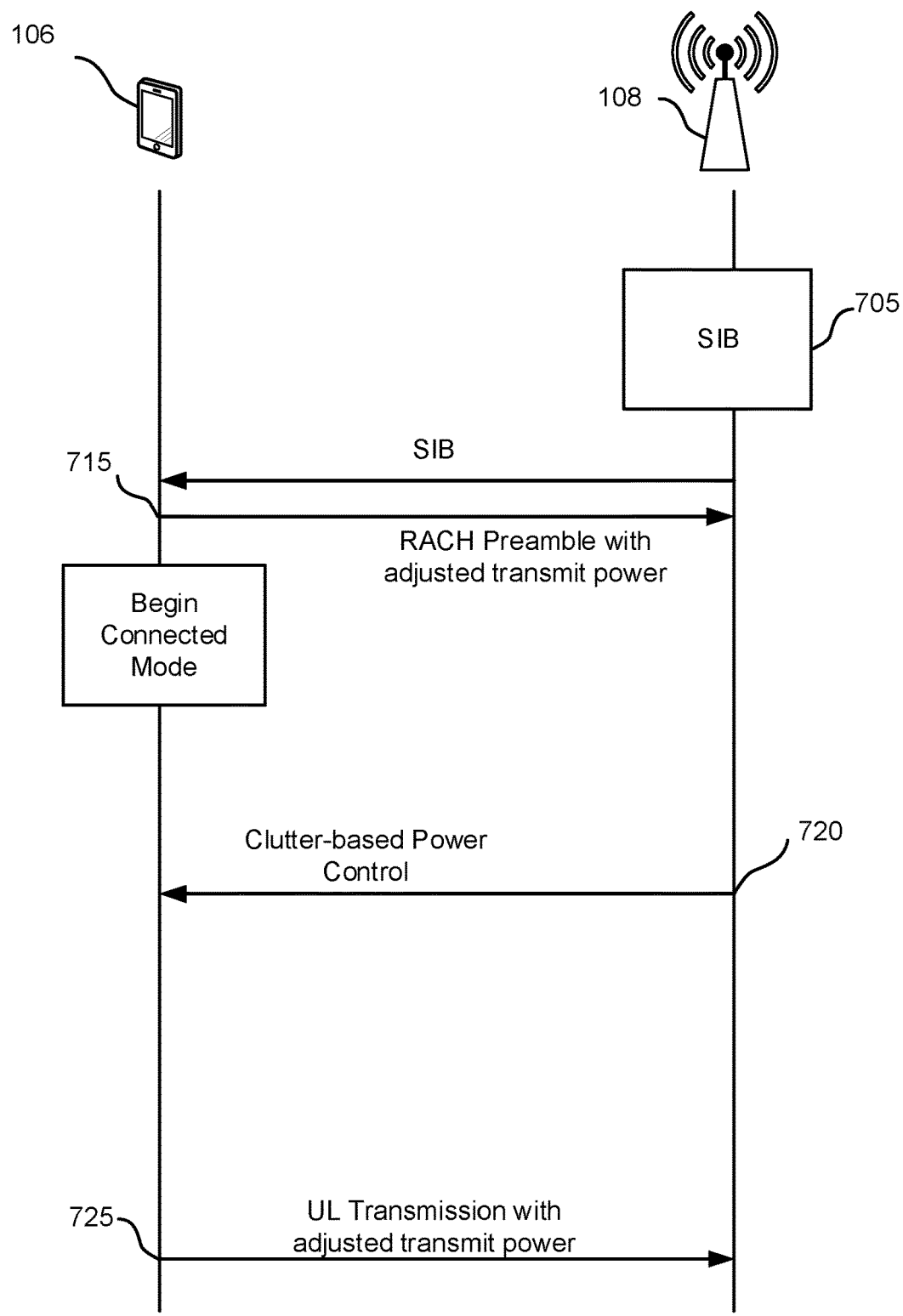
FIG. 7 illustrates a signal flow between a base station and a user equipment in the system of FIG. 1 for the mitigation of clutter-induced interference.

Some example signal flows for clutter mitigation during both an initial access procedure and also during a connected mode of operation are shown in FIG. 7 between a base station 108 and a UE 106. Base station 108 transmits a clutter-identifying system information block (SIB) 705 during an initial access procedure for UE 106. UE 106 responds to SIB 705 with a RACH preamble 715 having an increased transmit power so that initial access procedure may be successful despite the presence of clutter interference at base station 108. During the connected mode of operation, base station 108 responds to the presence of clutter-induced interference by transmitting a clutter-based power control message 720 to UE 106. UE 106 responds by using an increased transmit power for the transmission of an uplink message 725. Due to the increased transmit power, uplink message 725 may be successfully received by base station 108 despite the presence of clutter-induced interference.

A variety of control messages may be used to form the clutter-based power control message 720. For example, the pre-existing closed loop Transmit Power Control (TPC) for the Physical Uplink Shared Channel (PUSCH) and for the Physical Uplink Control Channel (PUCCH) may be adapted to include a clutter-interference-based transmit power command. Should the base station 108 schedule a UE 106 into an UL message over time and frequency resources in an UL direction that will be subjected to clutter interference, the base station 108 may use a TPC command to command the UE 106 to use an increased transmit power. This increased power may be used for UL data messages in the PUSCH and also for UL control messages in the PUCCH. The UL direction subjected to clutter interference corresponds to whatever clutter-affected antenna beam that the base station 108 will be using to receive the UL message.

Alternatively, the base station 108 may use assistance information to form the clutter-based power control message 720 to configure the transmit power increment in the UE 106 responsive to the clutter interference identification. In yet another alternative, the base station 108 may use radio resource control (RRC) messaging to control the transmit power increment in the UE 106. In other embodiments, the base station 108 may use a downlink channel information (DCI) control message to configure the transmit power increment. Regardless of how the transmit power increment is communicated from the base station 108 to the UE 106, this communication may be group-cast (multicast) in common to other UEs or may be a point-to-point message that is individual to the UE 106. As discussed with regard to the initial access control, the power control may be binary so as to merely indicate the presence or absence of clutter. Alternatively, the power control message may be multi-bit message so as to identify various levels of clutter interference. An example UE 106 and base station 108 architecture will now be considered.

Figure 8:
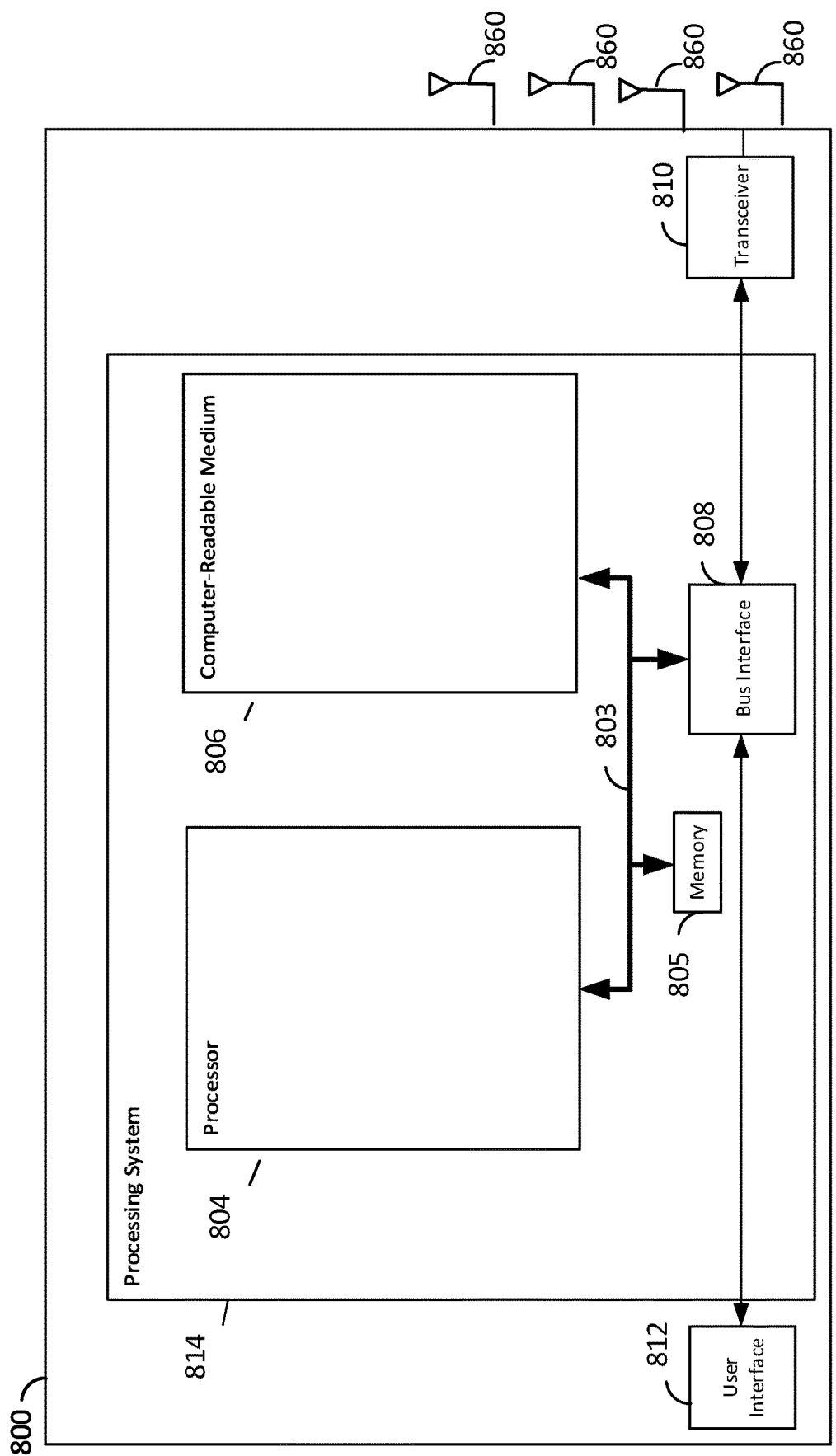
FIG. 8 illustrates an architecture for a network node in the system of FIG. 1 in accordance with an aspect of the disclosure.

A network node 800 is shown in FIG. 8 that is generic to a UE 106 or a base station 108. Network node 800 includes a processing system 814 having a bus interface 808, a bus 802, memory 805, a processor 804, and a computer-readable medium 806. Furthermore, node 800 may include a user interface 812 and a transceiver 810. Transceiver 810 transmits and receives through an array of antennas 860.

Processor 804 is also responsible for managing the bus 802 and general processing, including the execution of software stored on the computer-readable medium 806. The software, when executed by the processor 804, causes the processing system 814 to perform clutter-induced interference mitigation disclosed herein. The computer-readable medium 806 and the memory 805 may also be used for storing data that is manipulated by the processor 804 when executing software.

The bus 802 may include any number of interconnecting buses and bridges depending on the specific application of the processing system 814 and the overall design constraints. The bus 802 communicatively couples together various circuits including one or more processors (represented generally by the processor 804), the memory 805, and computer-readable media (represented generally by the computer-readable medium 806). The bus 802 may also link various other circuits such as timing sources, peripherals, voltage regulators, and power management circuits, which are well known in the art, and therefore, will not be described any further. The bus interface 808 provides an interface between the bus 802 and the transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

Some aspects of the preceding discussion will now be summarized in the following clauses.

Clause 1. A method of wireless communication for a user equipment (UE), comprising:
  receiving a clutter-based power command at the UE, the clutter-based power command indicating a presence of a clutter-induced interference at a base station;
  increasing a transmit power from an initial transmit power level to an increased power level responsive to the clutter-based power command; and
  transmitting a random-access message from the UE to the base station using the increased transmit power.

Clause 2. The method of wireless communication of clause 1, wherein the random-access message is a Random-Access Channel (RACH) preamble.

Clause 3. The method of wireless communication of clause 2, wherein the RACH preamble occupies a set of frequency and time resources used for downlink messages from the base station.

Clause 4. The method of wireless communication of clause 2, wherein the RACH preamble occupies a first set of frequency and time resources that overlap with a second set of frequency and time resources used for downlink messages from the base station.

Clause 5. The method of wireless communication of clause 2, wherein the RACH preamble occupies a set of time slots spanning across a first set of subcarriers, and wherein the set of time slots are used for downlink messages from the base station that span across a second set of subcarriers, the first set of subcarriers and the second set of subcarriers being separated by a guard band.

Clause 6. The method of wireless communication of any of clauses 1-5, wherein the receiving of the clutter-based power command at the UE comprises receiving a system information block (SIB) at the UE.

Clause 7. The method of wireless communication of clause 6, wherein the SIB includes a one-bit field that identifies the presence of the clutter-induced interference.

Clause 8. The method of wireless communication of clause 6, wherein the SIB includes a multi-bit field that identifies the presence of the clutter-induced interference and a relative power of the clutter-induced interference.

Clause 9. The method of wireless communication of clause 8, wherein the increasing of the transmit power comprises increasing the transmit power to one of a plurality of levels responsive to a relative strength of the clutter-b interference.

Clause 10. The method of wireless communication of any of clauses 1-9, further comprising:
  receiving a synchronization signal block (SSB) at the UE, wherein the SSB provides information used by the UE to receive the clutter-based power command.

Clause 11. A method of clutter mitigation for a base station, comprising:
  scanning through a plurality of antenna beams for the base station to identify an affected antenna beam that is subjected to a clutter-induced interference;
  transmitting a clutter-based power command from the base station using the affected antenna beam; and
  receiving at the base station a random-access message from a user equipment having a transmit power that is increased from an initial transmit level responsive to the clutter-based power command.

Clause 12. The method of clutter mitigation of clause 11, wherein the clutter-based power command is included within a system information block (SIB).

Clause 13. The method of clutter mitigation of clause 12, wherein the SIB includes a one-bit field that identifies a presence of the clutter-induced interference.

Clause 14. The method of clutter mitigation of clause 12, wherein the SIB includes a multi-bit field that identifies a power level of the clutter-induced interference.

Clause 15. The method of clutter mitigation of any of clauses 11-14, wherein the scanning through the plurality of antenna beams is a periodic scanning Clause 16. The method of clutter mitigation of any of clauses 11-14, wherein the scanning through the plurality of antenna beams is an aperiodic scanning Clause 17. The method of clutter mitigation of any of clauses 11-16, wherein the random-access message is a Random-Access Channel (RACH) preamble that occupies a first set of resource elements.

Clause 18. The method of clutter mitigation of clause 17, further comprising:
  while receiving the RACH preamble, transmitting a downlink message from the base station, the downlink message occupying the first set of resource elements.

Clause 19. The method of clutter mitigation of clause 17, wherein the first set of resource elements occupies a first set of subcarriers and a first set of time slots, the method of clutter mitigation further comprising:
  while receiving the RACH preamble, transmitting a downlink message from the base station, the downlink message occupying a second set of resource elements that occupies the first set of time slots and a second set of subcarriers, the second set of subcarriers being separated from the first set of subcarriers by a guard band.

Clause 20. A method of wireless communication for a user equipment (UE), comprising:
  at the UE, performing an initial access procedure with a base station to begin a connected mode of operation;
  during the connected mode of operation, receiving a clutter-based power command at the UE from the base station indicating a presence of a clutter-induced interference at the base station;
  increasing a transmit power from an initial level to an increased level of transmit power responsive to the clutter-based power command; and transmitting an uplink message from the UE to the base station using the increased level of transmit power.

Clause 21. The method of wireless communication of clause 20, wherein the clutter-based power command is a Transmit Power Control (TPC) message.

Clause 22. The method of wireless communication of clause 20, wherein the clutter-based power command comprises assistance information.

Clause 23. The method of wireless communication of clause 20, wherein the clutter-based power command is a Radio Resource Control (RRC) message.

Clause 24. The method of wireless communication of clause 20, wherein the clutter-based power command is a Downlink Control Information (DCI) message.

Clause 25. The method of wireless communication of any of clauses 20-24, wherein the uplink message is an in-band full duplex message.

Clause 26. The method of wireless communication of any of clauses 20-24, wherein the uplink message is a sub-band frequency duplex message.

Clause 27. A method of clutter mitigation for a base station, comprising:
  during a connected mode of operation with a user equipment, transmitting from the base station a clutter-based power command indicating a presence of a clutter-induced interference at the base station; and
  receiving at the base station an uplink message having an increased transmit power relative to an initial transmit power responsive to the clutter-based power command, wherein the uplink message is selected from the group consisting of an in-band full duplex message and a sub-band frequency duplex message.

Clause 28. The method of clutter mitigation of clause 27, wherein the transmitting from the base station of the clutter-based power command is a multi-cast transmission.

Clause 29. The method of clutter mitigation of clause 27, wherein the transmitting from the base station of the clutter-based power command is a single-cast transmission.

Clause 30. The method of clutter mitigation of clause 27, wherein the clutter-based power command is a Transmit Power Control (TPC) message.

Clause 31. The method of clutter mitigation of clause 27, wherein the clutter-based power command comprises assistance information.

Clause 32. The method of clutter mitigation of clause 27, wherein the clutter-based power command is a Radio Resource Control (RRC) message.

Clause 33. The method of clutter mitigation of clause 27, wherein the clutter-based power command is a Downlink Control Information (DCI) message.

Clause 34. A user equipment, comprising:
  a processor configured to configured to issue a command for a transmit power increase responsive to a clutter-based power command from a base station indicating a presence of a clutter-induced interference at the base station; and
  a transceiver configured to transmit a random-access message to the base station using an increased transmit power relative to an initial transmit power responsive to the command from the processor.

Clause 35. The user equipment of clause 34, wherein the clutter-based power command is a one-bit command.

Clause 36. The user equipment of clause 34, wherein the clutter-based power command is a multi-bit command.

Clause 37. The user equipment of any of clauses 34-36, wherein the clutter-based power command is included within a system information block.

Clause 38. The user equipment of any of clauses 34-37, wherein the random-access message is a Random-Access Channel (RACH) preamble.

Clause 39. The user equipment of clause 38, wherein the RACH preamble occupies a set of frequency and time resources used for downlink messages from the base station.

Clause 40. The user equipment of clause 38, wherein the RACH preamble occupies a first set of frequency and time resources that overlap with a second set of frequency and time resources used for downlink messages from the base station.

Clause 41. A base station, comprising:
  a processor configured to scan through a plurality of antenna beams to identify an affected antenna beam that is subjected to a clutter-induced interference; and
  a transceiver configured to transmit a clutter-based power command using the affected antenna beam, wherein the clutter-based power command is a command to a user equipment to increase its transmit power to mitigate the clutter-induced interference.

Clause 42. The base station of clause 41, wherein the clutter-based command is included within a system information block (SIB).

Clause 43. The base station of clause 42, wherein the SIB includes a one-bit field to indicate a presence of the clutter-induced interference.

Clause 44. The base station of clause 42, wherein the SIB includes a multi-bit field to indicate a power level of the clutter-induced interference.

Clause 45. The base station of any of clauses 41-44, wherein the processor is further configured so that the scanning through the plurality of antenna beams is a periodic scanning.

Clause 46. The base station of any of clauses 41-44, wherein the processor is further configured so that the scanning through the plurality of antenna beams is an aperiodic scanning.

Clause 47. The base station of any of clauses 41-46, wherein the transceiver is further configured to receive a random-access message from the user equipment having a transmit power that is increased relative to an initial transmit power responsive to the clutter-based power command.

Clause 48. The base station of clause 47, wherein the random-access message is a Random-Access Channel (RACH) preamble that occupies a first set of resource elements.

Clause 49. The base station of clause 48, wherein the transceiver is further configured to transmit a downlink message that occupies the first set of resource elements.

Clause 50. A user equipment, comprising:
  a processor configured to configured to issue a command for a transmit power increase responsive to a clutter-based power command from a base station indicating a presence of a clutter-induced interference at the base station; and
  a transceiver configured to transmit an uplink message to the base station during a connected mode of operation using an increased transmit power relative to an initial transmit power responsive to the command from the processor.

Clause 51. The user equipment of clause 50, wherein the clutter-based power command is a Transmit Power Control (TPC) message.

Clause 52. The user equipment of clause 50, wherein the clutter-based power command comprises assistance information.

Clause 53. The user equipment of clause 50, wherein the clutter-based power command is a Radio Resource Control (RRC) message.

Clause 54. The user equipment of clause 50, wherein the clutter-based power command is a Downlink Control Information (DCI) message.

Clause 55. The user equipment of any of clauses 50-54, wherein the uplink message is an in-band full duplex message.

Clause 56. The user equipment of any of clauses 50-54, wherein the uplink message is a sub-band frequency duplex message.

Clause 57. A base station, comprising:
a processor configured to scan through a plurality of antenna beams to identify an affected antenna beam that is subjected to a clutter-induced interference; and
a transceiver configured to transmit a clutter-based power command using the affected antenna beam, wherein the clutter-based power command is a command to a user equipment during a connected mode of operation to increase its transmit power to mitigate the clutter-induced interference, the transceiver being further configured to receive an uplink message from the user equipment having an increased transmit power relative to an initial transmit power level responsive to the clutter-based power command.

Clause 58. The base station of clause 57, wherein the uplink message is selected from the group consisting of an in-band full duplex message and a sub-band frequency duplex message.

Clause 59. The base station of any of clauses 57-58, wherein the transceiver is further configured to transmit the clutter-based power command using a multi-cast transmission.

Clause 60. The base station of any of clauses 57-58, wherein the transceiver is further configured to transmit the clutter-based power command using a single-cast transmission.

Clause 61. The base station of any of clauses 57-60, wherein the clutter-based power command is a Transmit Power Control (TPC) message.

Clause 62. The base station of any of clauses 57-60, wherein the clutter-based power command comprises assistance information.

Clause 63. The base station of any of clauses 57-60, wherein the clutter-based power command is a Radio Resource Control (RRC) message.

Clause 64. The base station of any of clauses 57-60, wherein the clutter-based power command is a Downlink Control Information (DCI) message.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims.

What is claimed is:

1. A method of wireless communication for a user equipment (UE), comprising:
receiving a clutter-based power command at the UE, the clutter-based power command indicating a presence of a clutter-induced interference at a base station;
increasing a transmit power from an initial transmit power level to an increased power level responsive to the clutter-based power command; and
transmitting a message from the UE to the base station using the increased transmit power.

2. The method of wireless communication of claim 1, wherein the message is a Random-Access Channel (RACH) preamble.

3. The method of wireless communication of claim 2, wherein the receiving of the clutter-based power command at the UE comprises receiving a system information block (SIB) at the UE.

4. The method of wireless communication of claim 3, wherein the SIB includes a one-bit field that identifies the presence of the clutter-induced interference.

5. The method of wireless communication of claim 1, wherein the clutter-based power command is a Transmit Power Control (TPC) message during a connected mode of operation for the UE.

6. The method of wireless communication of claim 1, wherein the clutter-based power command comprises assistance information during a connected mode of operation for the UE.

7. The method of wireless communication of claim 1, wherein the clutter-based power command is a Radio Resource Control (RRC) message during a connected mode of operation for the UE.

8. The method of wireless communication of claim 1, wherein the clutter-based power command is a Downlink Control Information (DCI) message during a connected mode of operation for the UE.

9. A user equipment, comprising:
a processor configured to configured to issue a command for a transmit power increase responsive to a clutter-based power command from a base station indicating a presence of a clutter-induced interference at the base station; and
a transceiver configured to transmit a message to the base station using an increased transmit power relative to an initial transmit power responsive to the command from the processor.

10. The user equipment of claim 9, wherein the clutter-based power command is included within a system information block.

11. The user equipment of claim 9, wherein the message is a Random-Access Channel (RACH) preamble.

12. The user equipment of claim 9, wherein the clutter-based power command is a Transmit Power Control (TPC) message.

13. The user equipment of claim 9, wherein the clutter-based power command comprises assistance information.

14. The user equipment of claim 9, wherein the clutter-based power command is a Radio Resource Control (RRC) message.

15. The user equipment of claim 9, wherein the clutter-based power command is a Downlink Control Information (DCI) message.

16. The user equipment of claim 9, wherein the message is an in-band full duplex message.

* * * * *